(12) United States Patent
Andrade, Jr. et al.

(10) Patent No.: US 8,496,163 B1
(45) Date of Patent: Jul. 30, 2013

(54) SYSTEMS AND METHODS FOR HIGH SPEED DOCUMENT MAILING

(75) Inventors: Lionel F. Andrade, Jr., Comfort, TX (US); Miguel A. Arguello, San Antonio, TX (US); Robert M. Pollom, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 383 days.

(21) Appl. No.: 12/177,984

(22) Filed: Jul. 23, 2008

Related U.S. Application Data

(60) Provisional application No. 61/022,913, filed on Jan. 23, 2008.

(51) Int. Cl.
*G06F 17/00* (2006.01)

(52) U.S. Cl.
USPC ............. 235/375; 235/487; 705/410; 705/80

(58) Field of Classification Search
USPC ................................ 705/410, 404
See application file for complete search history.

(56) References Cited

U.S. PATENT DOCUMENTS

| | | | |
|---|---|---|---|
| 4,020,615 A | 5/1977 | Irvine et al. | |
| 5,220,770 A | 6/1993 | Szewczyk et al. | |
| 5,340,158 A | 8/1994 | Bartl | |
| 5,704,543 A | 1/1998 | Pollanen | |
| 5,754,434 A | 5/1998 | Delfer et al. | |
| 6,494,019 B1 | 12/2002 | Lingle | |
| 2001/0032881 A1 | 10/2001 | Wells et al. | |
| 2003/0111524 A1 | 6/2003 | Wells et al. | |
| 2004/0260424 A1 | 12/2004 | Mahar | |
| 2005/0049890 A1* | 3/2005 | Kan | 705/1 |
| 2005/0071297 A1 | 3/2005 | Kara | |
| 2006/0080122 A1* | 4/2006 | Klopsch et al. | 705/1 |
| 2007/0050317 A1* | 3/2007 | McNairy | 705/410 |
| 2007/0055639 A1 | 3/2007 | Garvey et al. | |
| 2007/0100778 A1 | 5/2007 | Enright | |
| 2007/0110276 A1 | 5/2007 | O'Connell et al. | |
| 2008/0071558 A1* | 3/2008 | Crutchfield | 705/1 |
| 2008/0086983 A1* | 4/2008 | Kapturowski et al. | 53/381.5 |
| 2009/0070278 A1* | 3/2009 | Rosen | 705/407 |
| 2010/0058637 A1 | 3/2010 | Short | |
| 2010/0259790 A1 | 10/2010 | Pagel | |

FOREIGN PATENT DOCUMENTS

WO   WO 2007000600 A1 *   1/2007

\* cited by examiner

*Primary Examiner* — Thien M Le
*Assistant Examiner* — Sonji Johnson
(74) *Attorney, Agent, or Firm* — Brooks, Cameron & Huebsch, PLLC

(57) ABSTRACT

High speed document mailing comprises receiving package tracking data electronically from a courier for a document to be shipped via the courier, digitally placing the package tracking data onto a page within the document, printing out the document, and automatically inserting the document into an envelope such that the package tracking data on the page is visible through a window of the envelope.

18 Claims, 11 Drawing Sheets

SYSTEMS AND METHODS FOR HIGH SPEED DOCUMENT MAILING

CROSS REFERENCE TO RELATED APPLICATIONS

Priority is hereby claimed to U.S. provisional patent application No. 61/022,913 entitled "Systems And Methods for High Speed Document Mailing" and filed on 23 Jan. 2008.

Further, the patent applications below (including the present patent application) are filed concurrently and share a common title and disclosure, each of which is hereby incorporated herein by reference in its entirety:

U.S. patent application Ser. No. 12/177,991; and
U.S. patent application Ser. No. 12/177,999.

BACKGROUND

Currently, packages that require priority delivery require a separate shipping label including a tracking number to be printed out separately for each document to be sent. These shipping labels must then be manually affixed to the exterior of the package containing the document or manually inserted into a clear plastic pocket on the exterior of the package. This process is labor intensive and significantly reduces the number of packages that can be sent within a specified period of time.

In this regard, there is a need for an automated process for high speed document mailing.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, high speed document mailing is provided. For several embodiments, high speed document mailing comprises receiving package tracking data electronically from a courier for a document to be shipped via the courier, digitally placing the package tracking data onto a page within the document, printing out the document, and automatically inserting the document into an envelope such that the package tracking data on the page is visible through a window of the envelope.

Other advantages and features of the embodiments are described below.

BRIEF DESCRIPTION OF THE DRAWINGS

Systems and methods for high speed document mailing are further described with reference to the accompanying drawings in which.

DETAILED DESCRIPTION

Certain specific details are set forth in the following description and figures to provide a thorough understanding of various embodiments. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of various embodiments, and the steps and sequences of steps should not be taken as required to practice the embodiments.

Figure 1:
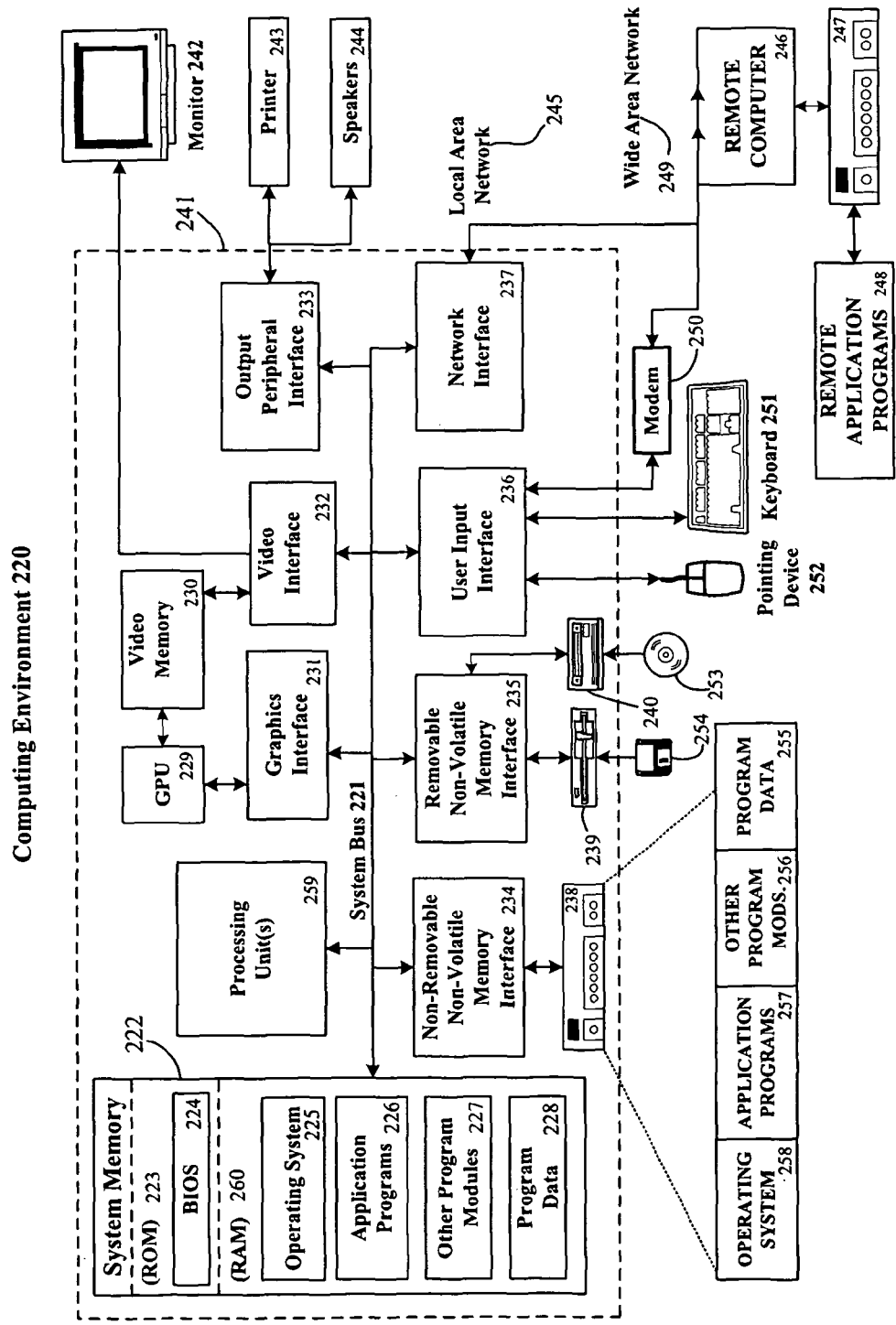
FIG. 1 is a block diagram representing an exemplary computing device suitable for use in conjunction with implementing high speed document mailing.

Referring next to FIG. 1, shown is a block diagram representing an exemplary computing device suitable for use in conjunction with implementing the processes described below. For example, the computer executable instructions that carry out the processes and methods for high speed document mailing may reside and/or be executed in such a computing environment as shown in FIG. 1. The computing system environment 220 is only one example of a suitable computing environment and is not intended to suggest any limitation as to the scope of use or functionality of the embodiments. Neither should the computing environment 220 be interpreted as having any dependency or requirement relating to any one or combination of components illustrated in the exemplary operating environment 220. For example a computer game console may also include those items such as those described below for use in conjunction with implementing the processes described below.

Aspects of the embodiments are operational with numerous other general purpose or special purpose computing system environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

An exemplary system for implementing aspects of the embodiments includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and include both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus

221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the embodiments, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the embodiments, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the embodiments in the context of one or more stand-alone computer systems, the embodiments are not so limited, but rather may be implemented in connection with any computing environment, such as a network or distributed computing environment. Still further, aspects of the embodiments may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
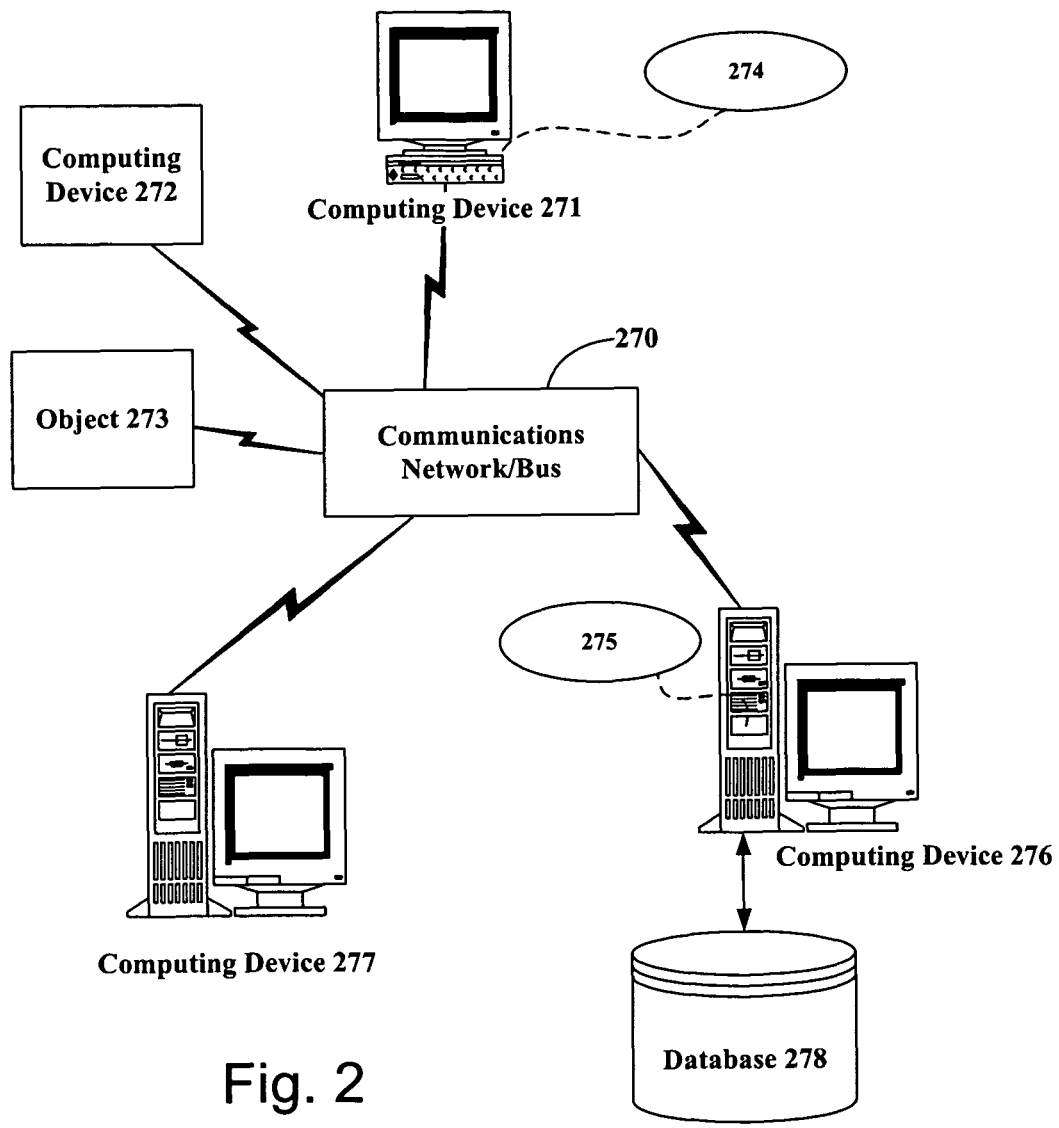
FIG. 2 illustrates an exemplary networked computing environment in which many computerized processes may be implemented to perform high speed document mailing.

Referring next to FIG. 2, shown is an exemplary networked computing environment in which many computerized processes may be implemented to perform the processes described below. For example, parallel computing may be part of such a networked environment with various clients on the network of FIG. 2 using and/or implementing high speed document mailing. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspects of the embodiments, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the embodiments should be construed in breadth and scope in accordance with the appended claims.

Figure 3:
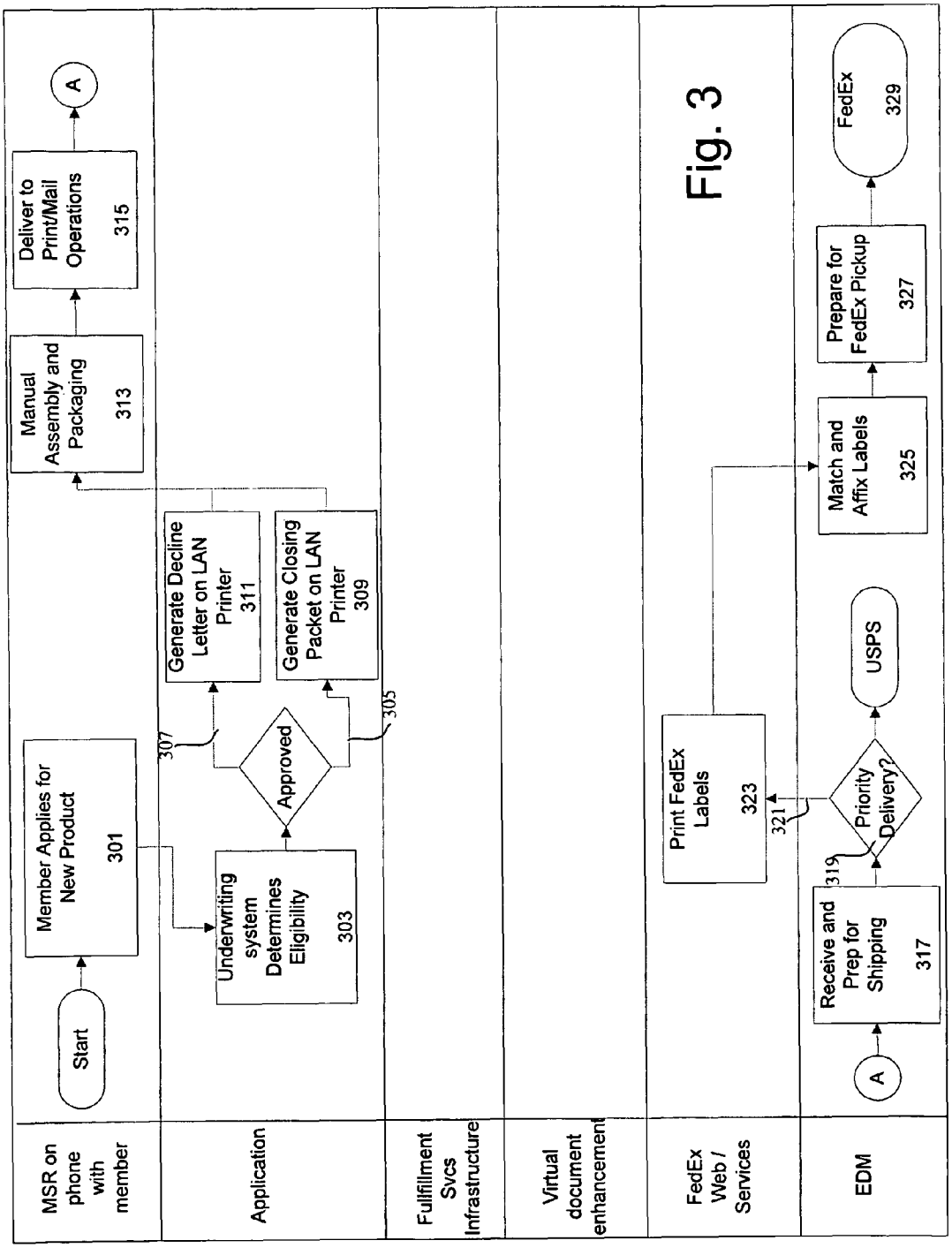
FIG. 3 is a flow chart illustrating an exemplary known manual process for mailing a response to a customer applying for a financial product.

Referring next to FIG. 3, shown is a flow chart illustrating an exemplary known manual process for mailing a response to a customer applying for a financial product. In the scenario depicted in FIG. 3, Federal Express (FedEx) is used as an example courier of the packages to be mailed according to manual process. However, it is understood that the process may be generally applicable to any package courier.

A financial institution member or costumer often applies (301) for a financial product with a member service representative (MSR). The underwriting system then determines eligibility (303) and based upon this eligibility, the application is either approved (305), or not approved (307). If the application is approved (305), then a closing packet for that particular financial product is printed (309). If the application is not approved (307), then a decline letter is printed (311). Either the decline letter or closing packet (whichever is applicable) is then manually assembled (313). This may comprise, for example, a person manually taking the documents from the printer and organizing them together for shipment. The document is then delivered (315) to another department such as a document mailing department (EDM), for example, for preparation for shipping (317).

The document mailing department then determines (319) the delivery method (First Class USPS or overnight via FedEx, for example). If the delivery method is overnight (321) via a private courier such as FedEx, the shipping labels are printed (323) and then manually affixed (325) to the exterior of the package, or slipped into a clear pocket on the exterior of the package. The package is then prepared (327) for pickup and then picked up (329) by the courier for delivery.

Figure 4:
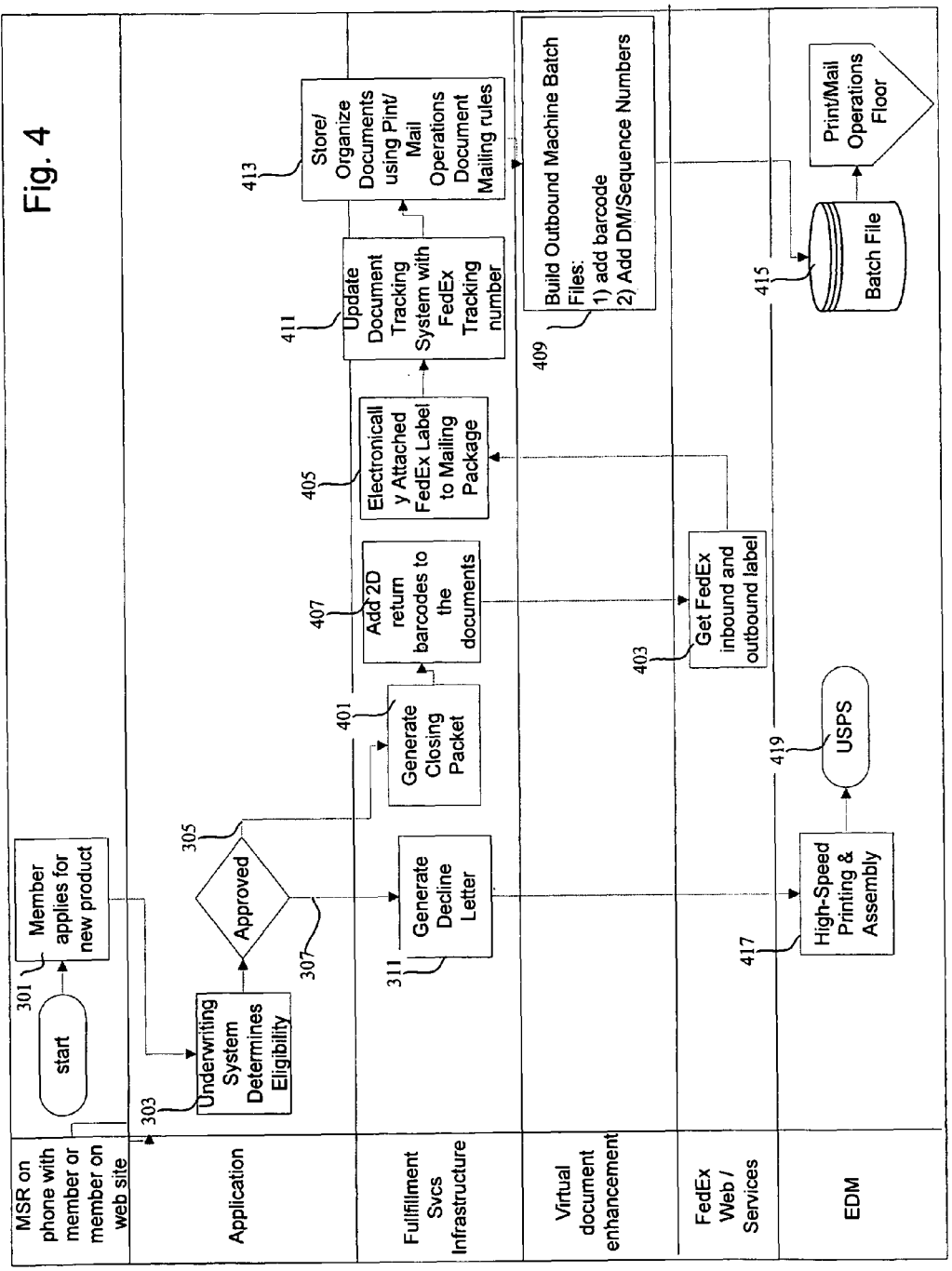
FIG. 4 is a flow chart illustrating an exemplary process for mailing a response to a customer applying for a financial product according to high speed document mailing.

Referring next to FIG. 4, shown is a flow chart illustrating an exemplary process for mailing a response to a customer applying for a financial product according to high speed document mailing. A financial institution member or costumer often applies (301) for a financial product with a member service representative (MSR). The underwriting system then determines eligibility (303) and based upon this eligibility, the application is either approved (305), or not approved (307). If the application is approved (305), then a closing packet for that particular financial product is generated (401). If the application is not approved (307), then a decline letter is printed (311), included in a high-speed printing and assembly process (417), and mailed (419) though the U.S. Postal Service (USPS). Note that the shipping labels including a tracking number are electronically obtained (403) in digital form from the courier before shipping and are included within the document as the top page of the document (i.e., electronically affixed (405) to the document).

Figure 6:
FIG. 6 is an example of a package tracking page included in a package to be mailed according to high speed document mailing.

Referring next to FIG. 6, shown is an example of such a package tracking page 600 included in a package to be mailed according to high speed document mailing. The page 600 includes the tracking number 601. Also, various bar codes and sequence numbers are added (407, 409) to each page of the document for tracking the sequence of individual pages and providing instructions to printers and other machines that automatically insert the contents of each package according to machine batch files (415). Each document is stored (413) and then printed at a later time along with other documents in batches to optimize efficiency according to electronic document mailing (EDM) rules.

Figure 5:
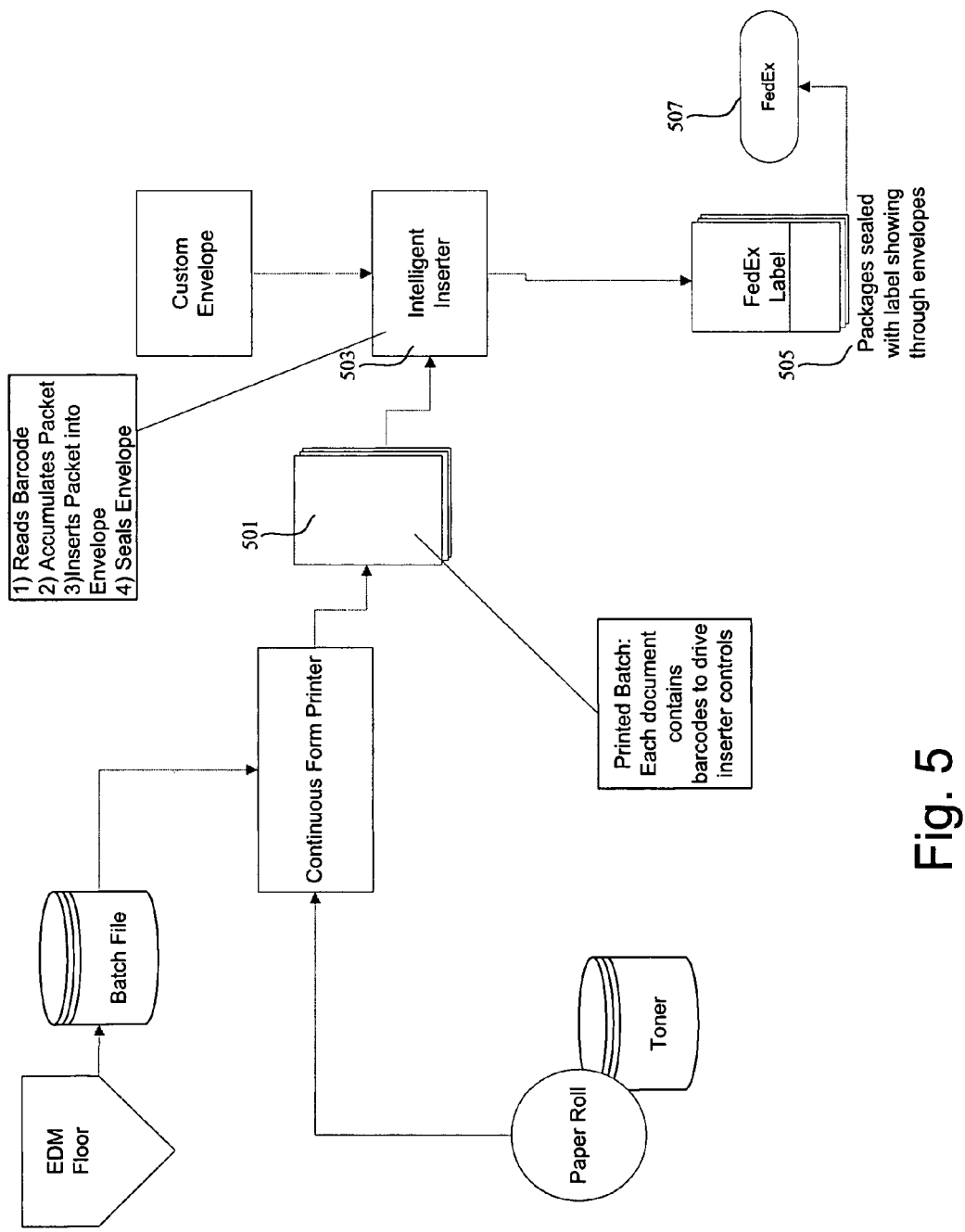
FIG. 5 is a flow chart illustrating an exemplary process of a high speed print and assembly of packages to be mailed according to high speed document mailing.
Figure 8:
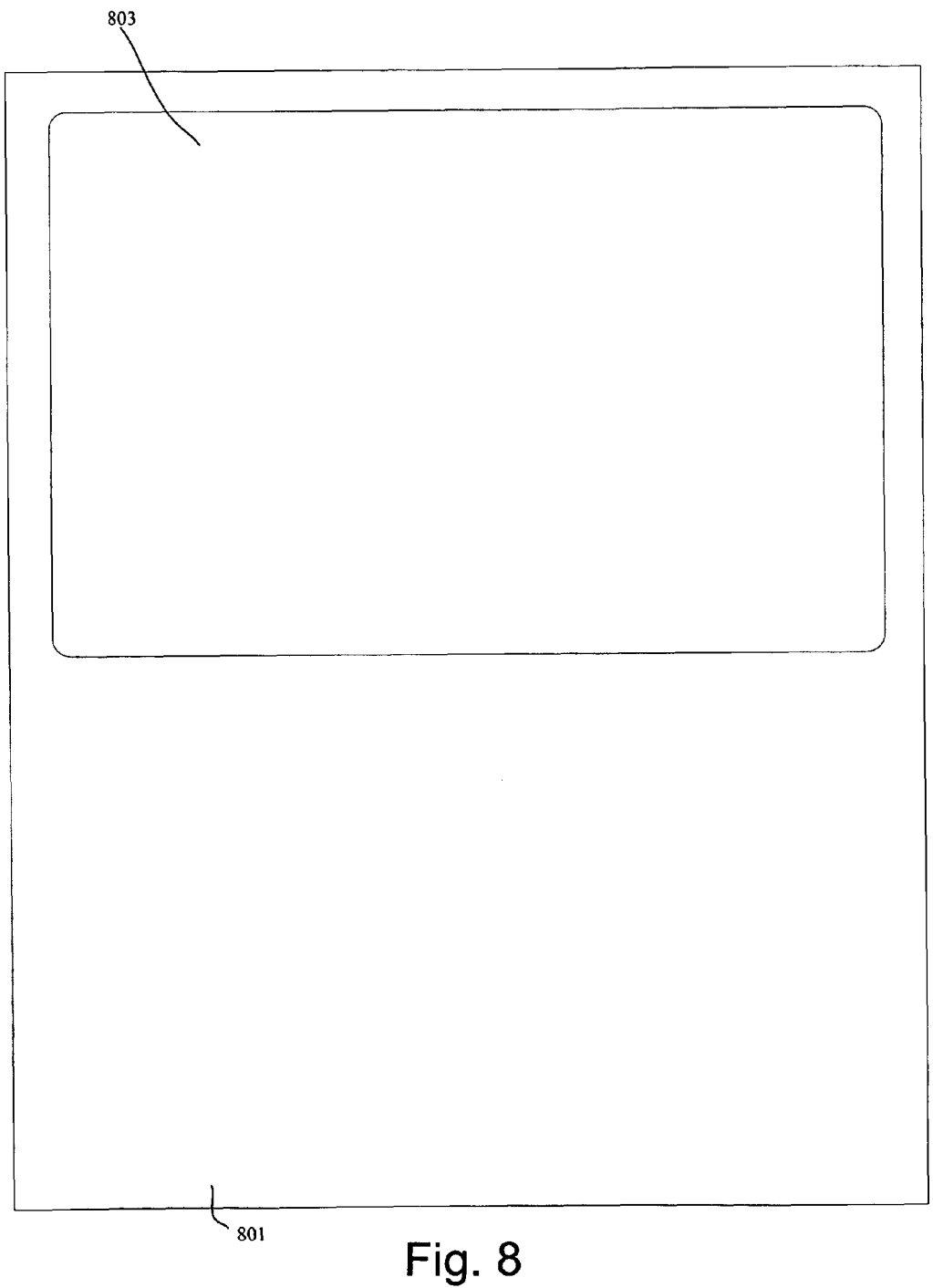
FIG. 8 is an example of an envelope that may be mailed according to high speed document mailing.
Figure 9:
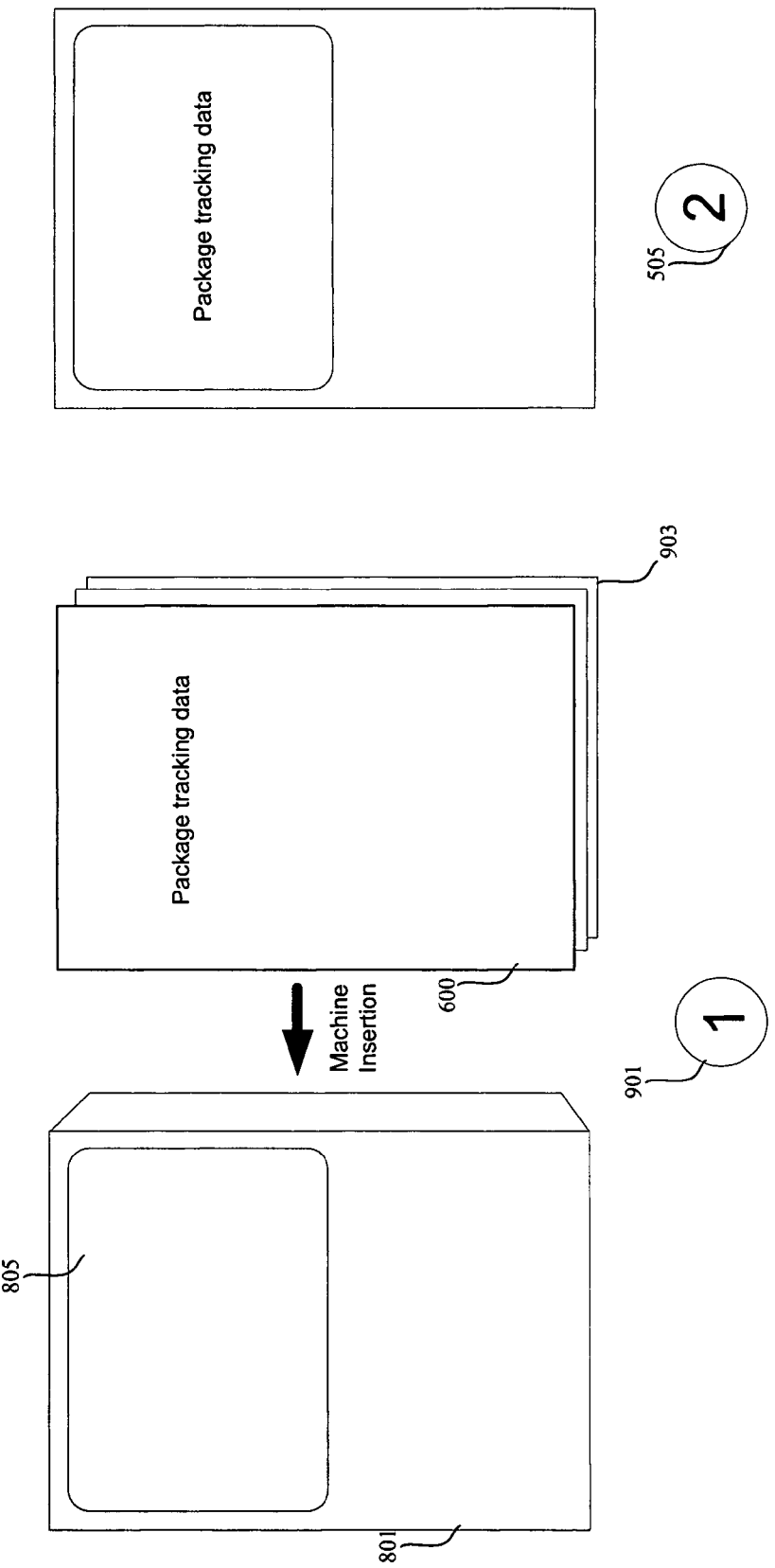
FIG. 9 is a diagram illustrating an example process of how documents are packaged for high speed document mailing.

Referring next to FIGS. 5 and 9, shown is a flow chart and diagram illustrating an exemplary process of high speed print and assembly of packages to be mailed according to high speed document mailing. Once the document is printed (501), it is placed into the intelligent inserter (503) that automatically inserts (901) the document (903) including the page 600 containing the shipping information and tracking number 601 (i.e., package tracking page, see FIG. 6) into a custom envelope 801 (see FIG. 8) having a custom envelope window 803 through which the shipping information and tracking number on the package tracking page 600 can be seen (see FIGS. 8 and 9). The package is then sealed (505) and the courier ships the package according to the information seen through the custom envelope window 803. Bar codes are included on pages within the document to configure the intelligent inserter appropriately for each package.

Figure 7:
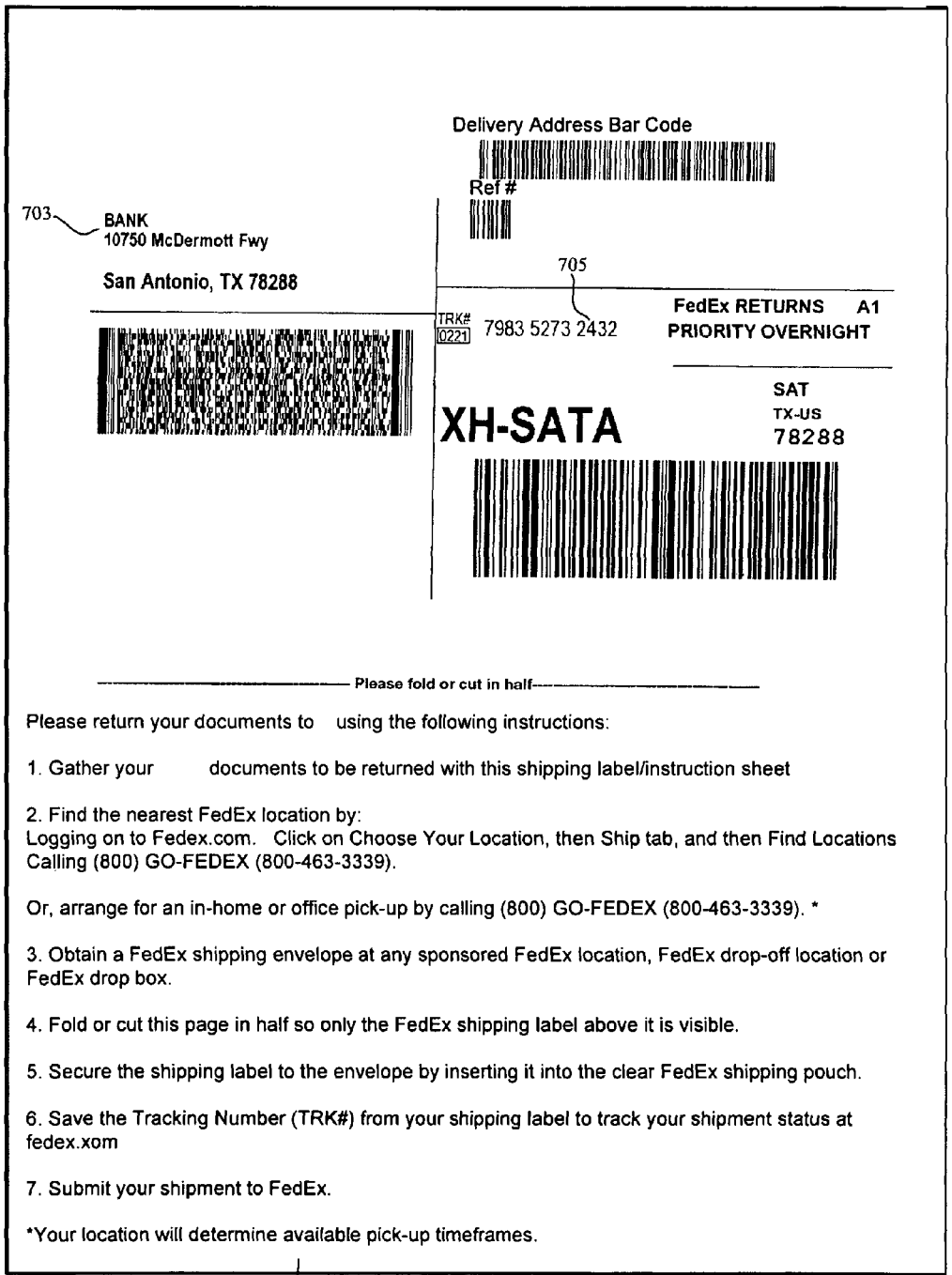
FIG. 7 is an example of a package tracking page included in a package having a return envelope to be mailed according to high speed document mailing.

Referring next to FIG. 7, shown is an example of a return package tracking page 701 included in a package having a custom return envelope to be mailed according to high speed document mailing. Shown is an example tracking number 705 and an example address 703 to which the package is to be sent using an included return envelope and the return package tracking page 701.

Figure 10:
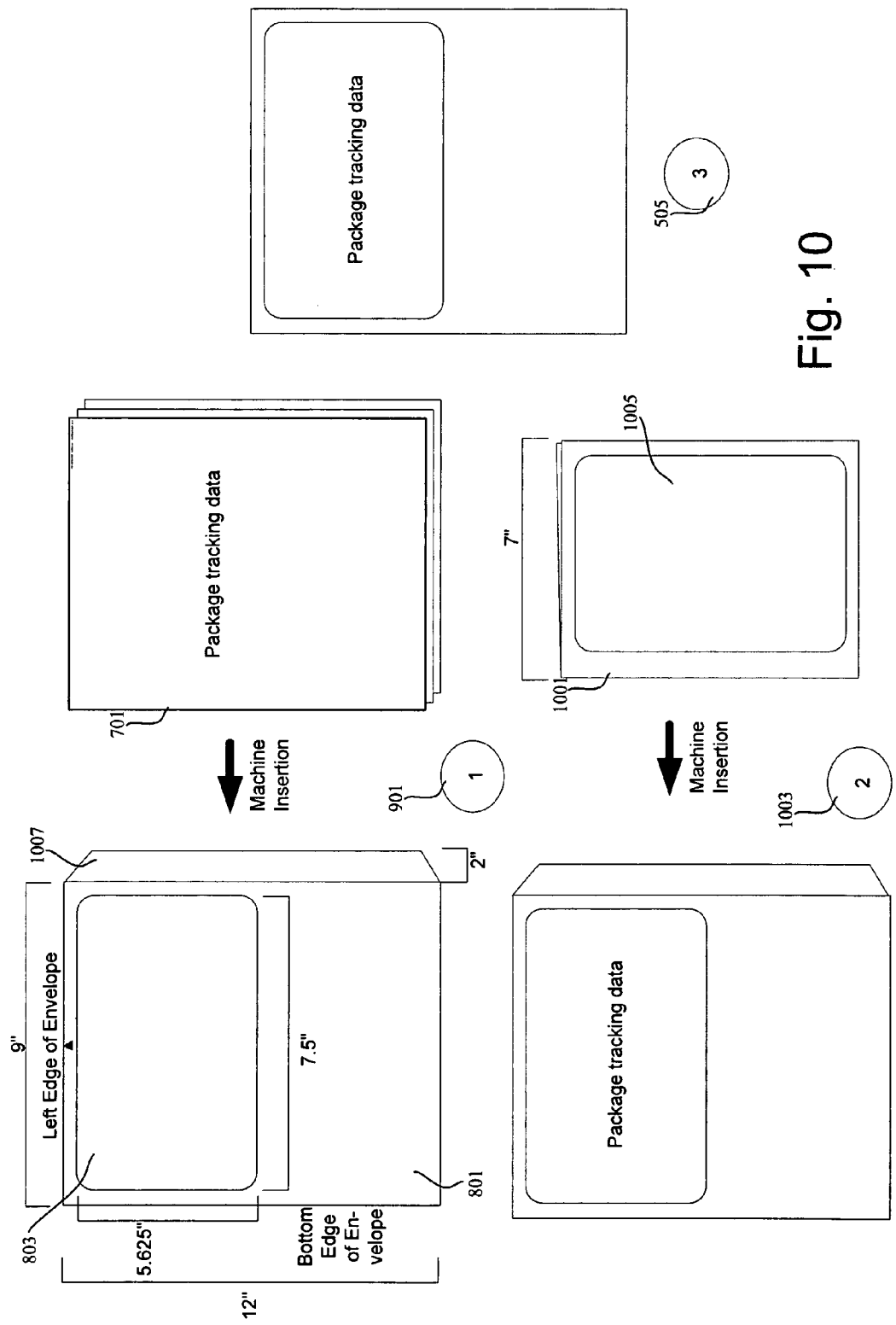
FIG. 10 is a diagram illustrating an example process of how documents are packaged for high speed document mailing when a return envelope is included in the package.

Referring next to FIG. 10, shown is a diagram illustrating an example process of how documents are packaged for high speed document mailing when a return envelope 1001 is included in the package. A return envelope 1001 may be included (1003) in the package if documents (e.g., signed papers) need to be shipped back. The recipient may then use the included return package tracking page 701 and insert it into the return envelope 1001 such that the shipping information and tracking number on the package tracking page can be seen through the envelope window 1005. An example of envelope 801 and return envelope 1001 specifications is also shown in FIG. 10 and provided below, however other sizes and specifications may be used. The envelope 801 may be approximately 9 inches by 12 inches. The window 803 may have width of approximately 5.625 inches and height of approximately 7.5 inches. The window 803 may be approximately 0.75 inches from the envelope bottom edge and approximately 0.75 inches from the envelope left edge. The envelope 801 may have an opening flap 1007 of approximately 12 inches by 2 inches and the flap 1007 may be straight with rounded corners. The envelope 801 has no fold such that it may be delivered flat. The return envelope 1001 may have the same specifications as the envelope 801, but also may have a fold 7 inches from the left edge of the envelope 1001 such that it may be inserted into another envelope and delivered folded as a return envelope. Also, the envelope 801 may have a stock specification of 28 # white wove.

Figure 11:
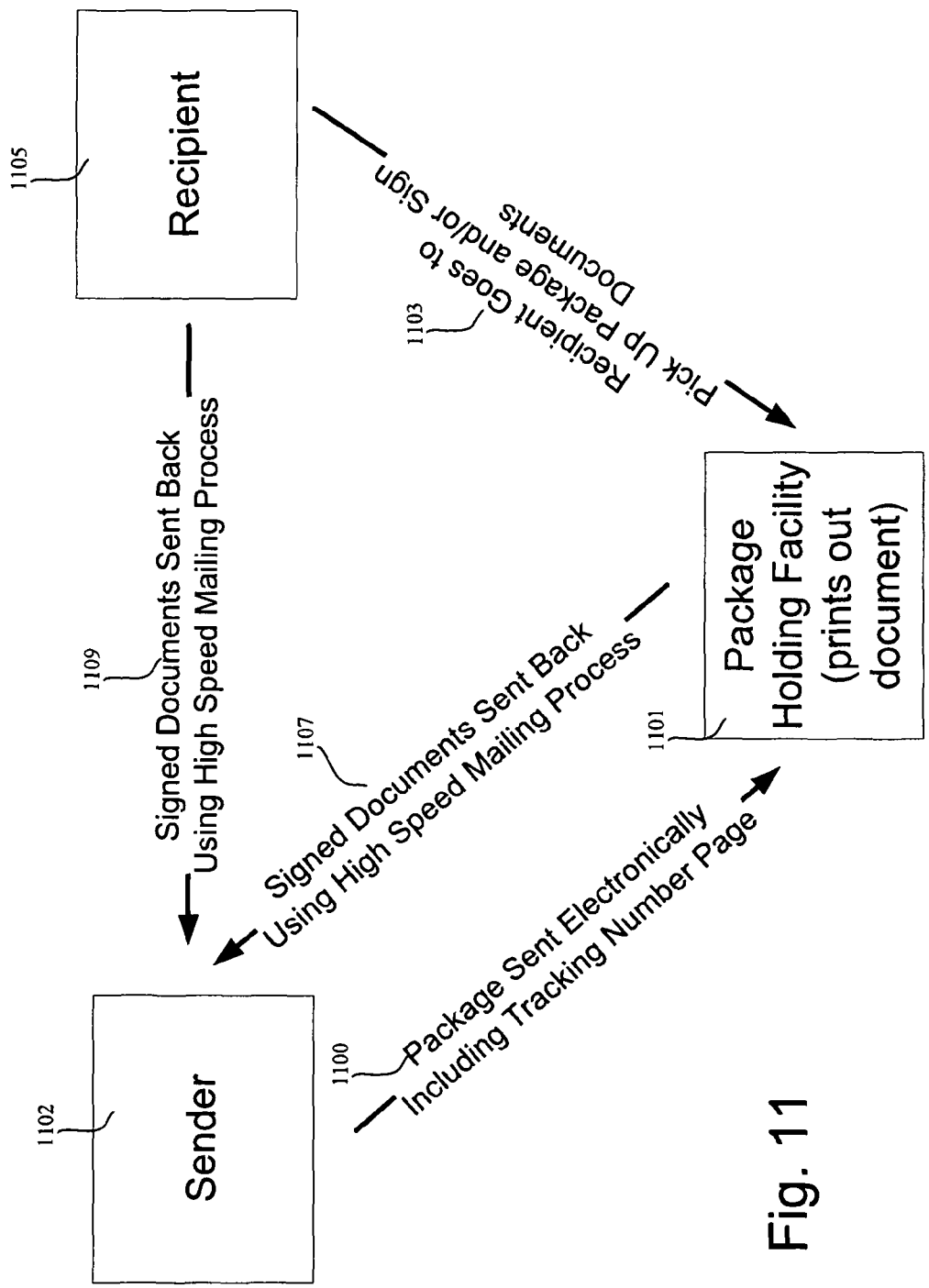
FIG. 11 is a block diagram illustrating an example process of how documents may be electronically delivered to a pick up center and then returned according to high speed document mailing.

Referring next to FIG. 11, shown is a block diagram illustrating an example process of how documents may be electronically delivered to a pick up center and then returned according to high speed document mailing. The document is initially sent electronically (1100) from a sender 1102 to an authorized package holding facility 1101. The electronic package includes a return package tracking/tracking number page. The recipient 1105 may then go to the package holding facility 1101 to print out (1103) the document and/or sign the needed pages and then use the return package tracking/tracking number page and custom envelop as described above to send (1109) the documents back or to have the authorized package holding facility 1101 send (1107) the documents back to whomever the addressee is on the package tracking page. The recipient, person or machine at the package holding facility 1101 may use the included return package tracking page and insert it into the custom envelope such that the shipping information and tracking number on the package tracking page can be seen through the envelope window as described above. Also, the recipient 1105 may prepare the package for shipping above and send (1109) it from any drop-off facility, box, or have it scheduled for pick-up and delivery.

It is noted that the foregoing examples have been provided merely for the purpose of explanation and are in no way to be construed as limiting. While various embodiments may have been described herein, it is understood that the words which have been used herein are words of description and illustration, rather than words of limitations. Further, although the embodiments has been described herein with reference to particular means, materials, the embodiments are not intended to be limited to the particulars disclosed herein; rather, the embodiments extends to all functionally equivalent structures, methods and uses, such as are within the scope of the appended claims. Those skilled in the art, having the benefit of the teachings of this specification, may effect numerous modifications thereto and changes may be made without departing from the scope and spirit of the embodiments in their aspects.

The invention claimed is:

1. A system for high speed document mailing comprising:
    at least one subsystem that receives document data and tracking data electronically at a pick up center from an entity;
    at least one subsystem that digitally places the tracking data onto a page within the document at the pick up center;
    at least one subsystem that adds at least one of a sequence number or a bar code to individual pages of the document to allow a machine at the pick up center to track the sequence of the individual pages of the document;
    at least one subsystem that prints out the document at the pick up center, wherein the at least one sequence number or bar code of the individual pages provide instructions to the at least one subsystem that prints out the document;
    at least one subsystem that automatically inserts the document into an envelope such that the tracking data on the page is visible through a window of the envelope, wherein the at least one sequence number or bar code of the individual pages provide instructions to the at least one subsystem that automatically inserts the document into the envelope;
    at least one subsystem that delivers the document to a customer at the pick up center; and
    at least one subsystem that receives the document from the customer at the pick up center and returns the document to the entity.

2. The system of claim 1 wherein the package tracking data includes one or more of the following: a package tracking number, an address, a code identifying contents of the document, information about a recipient of the package.

3. The system of claim 1 wherein the window of the envelope is sized such that package tracking data the size of a standard shipping label of the courier may be seen through the window.

4. The system of claim 1 further comprising at least one subsystem that sends the document to a recipient using the package tracking data.

5. The system of claim 1 further comprising:
    at least one subsystem that automatically repeats the previous steps multiple times for multiple documents in a batch job; and
    at least one subsystem that sends the document to recipients using the package tracking data.

6. The system of claim 1 further comprising at least one subsystem that updates a document tracking system with the package tracking data after receiving package tracking data electronically from the courier.

7. A method for high speed document mailing, comprising:
    receiving document data and tracking data electronically at a pick up center from an entity;
    digitally placing the tracking data onto a page within the document at the pick up center;
    adding at least one of a sequence number or bar code to individual pages of the document to allow a machine at the pick up center to track the sequence of the individual pages of the document;
    printing out the document at the pick up center, wherein the at least one sequence number or bar code of the individual pages provide instructions for printing out the document;
    automatically inserting the document into an envelope such that the tracking data on the page is visible through a window of the envelope, wherein the at least one sequence number or bar code of the individual pages provide instructions for automatically inserting the document into the envelope;
    delivering the document to a customer at the pick up center; and
    receiving the document from the customer at the pick up center and returning the document to the entity.

8. The method of claim 7 wherein the package tracking data includes one or more of the following: a package tracking number, an address, a code identifying contents of the document, information about a recipient of the package.

9. The method of claim 7 wherein the window of the envelope is sized such that package tracking data the size of a standard shipping label of the courier may be seen through the window.

10. The method of claim 7 further comprising sending the document to a recipient using the package tracking data.

11. The method of claim 7 further comprising:
    automatically repeating the previous steps multiple times for multiple documents in a batch job; and
    sending the documents to recipients using the package tracking data.

12. The method of claim 7 further comprising updating a document tracking system with the package tracking data after receiving package tracking data electronically from the courier.

13. A non-transitory computer-readable medium comprising computer-readable instructions for high speed document mailing, said computer-readable instructions comprising instructions for:
- receiving document data and tracking data electronically at a pick up center from an entity;
- digitally placing the tracking data onto a page within the document at the pick up center;
- adding at least one of a sequence number or a bar code to individual pages of the document to allow a machine at the pick up center to track the sequence of the individual pages of the document;
- printing out the document at the pick up center, wherein the at least one sequence number or bar code of the individual pages provide instructions for printing out the document;
- automatically inserting the document into an envelope such that the package tracking data on the page is visible through a window of the envelope, wherein the at least one sequence number or bar code of the individual pages provide instructions for automatically inserting the document into the envelope;
- delivering the document to a customer at the pick up center; and
- receiving the document from the customer at the pick up center and returning the document to the entity.

14. The non-transitory computer-readable medium of claim 13 wherein the package tracking data includes one or more of the following: a package tracking number, an address, a code identifying contents of the document, information about a recipient of the package.

15. The non-transitory computer-readable medium of claim 13 wherein the window of the envelope is sized such that package tracking data the size of a standard shipping label of the courier may be seen through the window.

16. The non-transitory computer-readable medium of claim 13 further comprising computer-readable instructions for sending the document to a recipient using the package tracking data.

17. The non-transitory computer-readable medium of claim 13 further comprising computer-readable instructions for:
- automatically repeating the previous steps multiple times for multiple documents in a batch job; and
- sending the documents to recipients using the package tracking data.

18. The non-transitory computer-readable medium of claim 13 further comprising computer-readable instructions for updating a document tracking system with the package tracking data after receiving package tracking data electronically from the courier.

* * * * *